Sept. 15, 1931. E. L. BENEDICT ET AL Re. 18,188

PAVING JOINT AND METHOD OF MAKING THE SAME

Original Filed April 8, 1920

Inventors:
Edward L. Benedict,
Robert L. Glose,
By Ballard Morse Atty.

Reissued Sept. 15, 1931

Re. 18,188

UNITED STATES PATENT OFFICE

EDWARD L. BENEDICT AND ROBERT L. GLOSE, OF PITTSBURGH, PENNSYLVANIA, ASSIGNORS, BY DIRECT AND MESNE ASSIGNMENTS, TO THE PHILIP CAREY MANUFACTURING COMPANY, A CORPORATION OF OHIO

PAVING JOINT AND METHOD OF MAKING THE SAME

Original No. 1,603,506, dated October 19, 1926, Serial No. 372,145, filed April 8, 1920. Application for reissue filed September 17, 1927. Serial No. 220,227.

The present invention relates to paving joint strips of compressible and elastic character which are adapted for use in paving structures to separate the rigid elements.

Our invention has relation to paving joints. One object of the invention is to provide a joint which is longitudinally corrugated, in such a manner as to interlock with the adjacent paving material at the sides of the joint, thereby acting to prevent the relative movement of such material in a vertical direction adjacent to the joint.

A further object of the invention is to provide a paving joint which is constructed of materials which render the joint permanently resilient, so that it will act efficiently as an expansion and contraction joint.

A still further object of the invention is to provide a joint which can be performed before being placed in the paving. Other objects and advantages of our invention will hereinafter appear.

Although with respect to that feature of our invention which has for its object the provision of a corrugated interlocking joint, the joint may be formed of any usual or suitable material, we prefer to construct a joint of fibrous material, such as wood pulp, and to shape the joint from a sheet of this material and to then impregnate it with a suitable filler which will remain permanently resilient or semi-resilient. Asphalt or creosote, for instance, may be used for this filler, these substances not only being waterproof but capable of permanently retaining their plasticity or resilience.

For a better understanding of the invention reference may be made to the drawings, in which:—

Figure 3 is a perspective view of still another form; and

Figure 1:
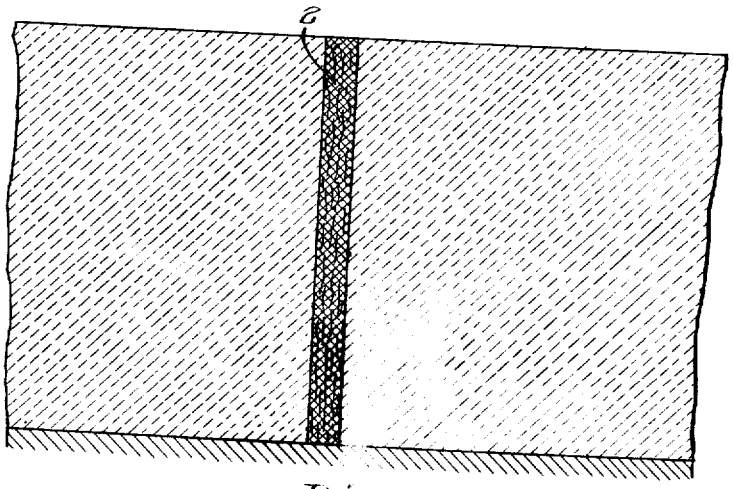
Figures 1 and 2 are sectional views showing different forms of our improved joint.
Figure 2:
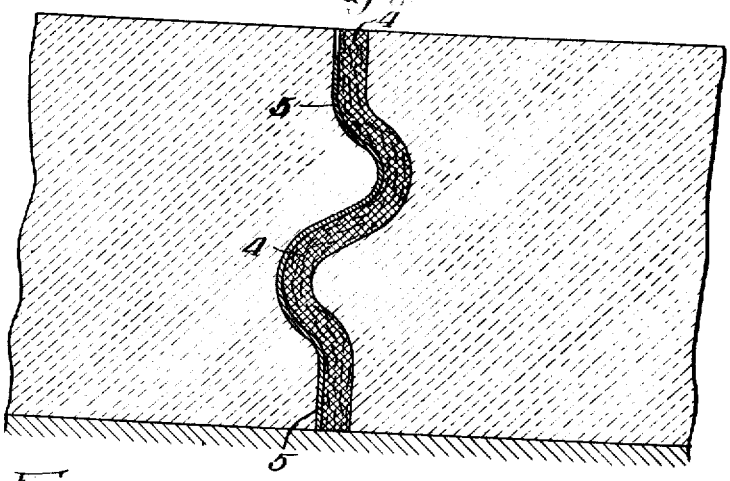
Figure 4:
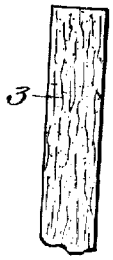
Figure 4 is a detail sectional view illustrating the form of material which we prefer to employ in the manufacture of the joint.
Figure 4:
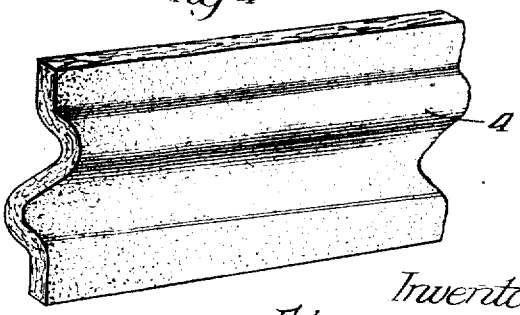

In making a joint from this material, the strip 2, which is to form the joint may be cut from a sheet of the fibrous material of the character indicated at 3 in Figure 4. If a straight or non-corrugated joint is to be used, as shown in Figure 4, this strip is then impregnated in any well known manner with the asphalt, creosote or other similar substance, and is then ready for use. If a corrugated joint is to be employed, as shown at 4 in Figure 2, the cut strip, preferably before impregnating, is longitudinally corrugated, as shown in Figures 2 and 3, although the corrugations may take various forms. After being corrugated, the formed strip is then impregnated with the asphalt, creosote or other material, and is then ready for use.

In Figure 2, we have also shown the strip as provided with a backing plate 5, at one side, of steel or other material, this plate preferably terminating at its upper edge somewhat below the surface of the pavement. The form of strip shown in this figure may consist of the material above described, or it may consist of any other suitable material. A backing plate of this character has been found to very effectively cooperate with the fibrous material and act as a reinforce therefor adding both strength and resiliency to the joint.

The corrugations, as will be readily understood, act to form an interlock which will effectively prevent any relative vertical movement of the paving bodies adjacent to the joint. Where the backing plate is utilized, the strength of the interlock is increased.

By the use of material, such as above described, we provide a joint which will permanently maintain its elastic or resilient character, and which can be completely preformed before it is placed in position in the paving. The fibrous material can be shipped in carload lots to the point of use, without crating; and the strips constituting the joints, can be cut and formed at or adjacent to the place where they are to be used, if desired.

The term "corrugation" or "corrugated," as employed throughout the specification and claims is definitive of any construction by means of which the main body of the material is displaced to one side or the other to form an interlock.

We claim:

1. The herein described method of making paving joints, which consists in forming a body or strip of fibrous material of proper shape to constitute the desired joint, and then impregnating the same with a filler of permanently elastic character, substantially as described.

2. The herein described method of making paving joints, which consists in providing a body or strip of fibrous material of proper shape to constitute the desired joint, corrugating the said strip longitudinally thereof, and then impregnating the same with a waterproof filler of permanent elastic character, substantially as described.

3. An expansion and contraction joint for concrete paving, comprising a thick stiff corrugated sheet of fibrous material impregnated with a permanently resilient filler and adapted to contact directly with the concrete paving, substantially throughout its height and on both its sides.

4. An expansion joint comprising a compressible body of bituminous material having an exterior metallic reinforcement terminating short of the top of said body, the whole arranged to form a joint having along its longitudinal center outwardly extending portions on one side and corresponding inwardly extending portions on the opposite side.

5. An expansion and contraction joint for concrete paving, comprising a thick stiff corrugated sheet of fibrous material impregnated with a permanently resilient filler and adapted to contact directly with the concrete paving with at least its upper portions substantially as described.

6. A paving joint strip having a resilient board-like form retaining body of the form and size of the strip, consisting of fibrous material, the faces of said body impregnated with a waterproof material.

7. A paving joint strip having a resilient board-like form retaining body of the form and size of the strip, consisting of fibrous material, said body impregnated with a waterproof material.

8. A paving joint strip having a resilient board-like form retaining body of the form and size of the strip, consisting of fibrous material, said body impregnated with asphalt.

9. A paving joint strip having a resilient board-like form retaining body of the form and size of the strip, consisting of fibrous vegetable material, said body impregnated with a waterproof material and a reinforcement for said body.

10. In a pavement, adjacent paving bodies separated to provide a space between said bodies, a strip for said space, consisting of a preformed board-like body of fibrous material of the size and form of the space between said paving bodies, said strip being impregnated with waterproofing material.

11. In a pavement, adjacent paving bodies separated to provide a space between said bodies, a strip for said space, consisting of a preformed resilient board-like body of fibrous material of the size and form of the space between said paving bodies, said strip being impregnated with waterproofing material.

EDWARD L. BENEDICT.
ROBERT L. GLOSE.

DISCLAIMER

Re. 18,188.—*Edward L. Benedict* and *Robert L. Glose*. Pittsburgh, Pa. PAVING JOINT AND METHOD OF MAKING THE SAME. Patent dated September 15, 1931. Disclaimer filed June 24, 1940, by the assignee, *Construction Materials Patents, Inc.*

Hereby enters this disclaimer of claims 7 and 8 in said specification of said reissue Letters Patent.

[*Official Gazette July 16, 1940.*]